United States Patent
Cox et al.

(10) Patent No.: US 8,520,054 B2
(45) Date of Patent: Aug. 27, 2013

(54) SYSTEM AND METHOD TO QUICKLY ACQUIRE IMAGES

(75) Inventors: Phillip Cox, Sylvania, OH (US); Robert C. Redmond, Toledo, OH (US); Zachary J. Ward, Perrysburg, OH (US); Dyne R. Hoenie, Celina, OH (US)

(73) Assignee: Techtol Holdings, LLC, Sylvania, OH (US)

( * ) Notice: Subject to any disclaimer, the term of this patent is extended or adjusted under 35 U.S.C. 154(b) by 1115 days.

(21) Appl. No.: 12/248,576

(22) Filed: Oct. 9, 2008

(65) Prior Publication Data

US 2009/0185027 A1 Jul. 23, 2009

Related U.S. Application Data

(60) Provisional application No. 61/022,911, filed on Jan. 23, 2008.

(51) Int. Cl.
*H04N 7/18* (2006.01)
*G06F 15/16* (2006.01)

(52) U.S. Cl.
USPC ............................................................ 348/36

(58) Field of Classification Search
USPC .............................................. 348/48, 36–39
See application file for complete search history.

(56) References Cited

U.S. PATENT DOCUMENTS

| | | | |
|---|---|---|---|
| 5,657,073 A | 8/1997 | Henley | |
| 5,659,323 A | 8/1997 | Taylor | |
| 6,052,539 A | 4/2000 | Latorre | |
| 6,327,381 B1 * | 12/2001 | Rogina et al. | 382/154 |
| 6,483,893 B1 * | 11/2002 | Achtnig et al. | 378/98.12 |
| 6,545,702 B1 * | 4/2003 | Konolige et al. | 348/36 |
| 6,674,461 B1 * | 1/2004 | Klapman | 348/42 |
| 7,015,954 B1 * | 3/2006 | Foote et al. | 348/218.1 |
| 7,102,666 B2 | 9/2006 | Kanade et al. | |
| 7,106,361 B2 | 9/2006 | Kanade et al. | |
| 7,277,118 B2 * | 10/2007 | Foote | 348/36 |
| 7,747,153 B2 * | 6/2010 | Ibaraki | 396/55 |
| 2001/0028399 A1 * | 10/2001 | Conley | 348/239 |
| 2002/0122113 A1 * | 9/2002 | Foote | 348/48 |
| 2002/0163582 A1 | 11/2002 | Gruber et al. | |
| 2004/0075627 A1 * | 4/2004 | Ouchi et al. | 345/76 |
| 2006/0104541 A1 * | 5/2006 | Baker et al. | 382/284 |
| 2009/0009604 A1 * | 1/2009 | Kanaoka et al. | 348/148 |
| 2009/0021614 A1 * | 1/2009 | Baker et al. | 348/262 |
| 2009/0027504 A1 * | 1/2009 | Lim et al. | 348/187 |

* cited by examiner

*Primary Examiner* — Zarni Maung
(74) *Attorney, Agent, or Firm* — Fraser Clemens Martin & Miller LLC; J. Douglas Miller

(57) ABSTRACT

An image capturing system includes: a plurality of image capturing devices, wherein each image capturing device is adapted to capture an image of an object and transmit the captured image; and a processor in communication with each of the image capturing devices, the processor adapted to transmit a, control signal to each of the image capturing devices, receive each of the captured images, process the captured images, and transmit the processed captured images, wherein the processing of the captured images includes combining the images to appear as a seamless single rotational image.

20 Claims, 4 Drawing Sheets

SYSTEM AND METHOD TO QUICKLY ACQUIRE IMAGES

CROSS-REFERENCE TO RELATED APPLICATION

This application claims the benefit of U.S. provisional patent application Ser. No. 61/022,911 filed Jan. 23, 2008.

FIELD OF THE INVENTION

The present invention relates generally to image capture and subsequent automatic processing of the captured images. More particularly, the invention is directed to a system and method for acquiring, processing, and displaying images.

BACKGROUND OF THE INVENTION

There are commercially available systems that involve the use of software and a computer controlled turntable that enables one using a digital camera to capture sequential digital images from multiple perspectives and subsequently assemble them into a rotational image. Such a process is time consuming and requires the subject or object in the field of view remain motionless for the entire process. The requirement to remain motionless becomes problematic for an individual or animal that needs to remain still for an extended period of time while being rotated.

An alternate method requires the subject to remain motionless while a single camera or a series of cameras are employed to obtain a plurality of images from a variety of positions around the subject. This method requires the background in each image to be exactly the same in order to achieve a "spin image" effect in which the image appears to be rotating from the viewer's point of reference. If the background were to vary slightly even with respect to color or hue the "spin image" effect is destroyed and instead the viewer perceives a "fly around" effect in which the object appears to be stationary as the viewer traverses a path around the object. Converting the "fly around" back to the "spin image" requires time consuming and laborious editing of each photo by one having sufficient knowledge in the field.

U.S. Pat. No. 5,659,323 to Taylor describes a method of obtaining a "freeze" effect of a subject within a scene by employing a series of cameras, along a predetermined path. U.S. Pat. No. 6,052,539 to Latorre describes a camera that produces a special effect, wherein a series of cameras with specific power supply and controller capabilities capture simultaneous exposures along a predetermined path. U.S. Pat. No. 7,102,666 to Kanade presents a complex methodology for stabilizing rotational images to produce the "spin image" effect utilizing multiple cameras with pan/tilt/zoom controls mounted around an area of interest. U.S. Pat. No. 7,106,361 to Kanade further presents a method to manipulate the point of interest in a sequence of images. However, the system and methods currently known and used are time consuming and usually require a user or operator to have sufficient knowledge and skill to create the final image effect.

It would be desirable to have a time efficient system and method for acquiring, processing, and displaying images, wherein the system and method create a "spin image" of a variety of subjects and objects in a manner of seconds, while automating the processing of the final captured images to minimize the required training and specialized knowledge of the user.

SUMMARY OF THE INVENTION

Concordant and consistent with the present invention, a time efficient system and method for acquiring, processing, and displaying images, wherein the system and method create a "spin images" for a variety of subjects and objects in a manner of seconds, while automating the processing of the final captured images to minimize the required training and specialized knowledge of the user, has surprisingly been discovered.

In one embodiment, an image capturing system comprises: a plurality of image capturing devices, wherein each image capturing device is adapted to capture an image of an object and transmit the captured image; and a processor in communication with each of the image capturing devices, the processor adapted to transmit a control signal to each of the image capturing devices, receive each of the captured images, process the captured images, and transmit the processed captured images based on the captured images, wherein the processing of the captured images includes combining the images to appear as a seamless single rotational image.

In another embodiment, an image capturing system comprises: a plurality of image capturing devices, wherein each image capturing device is adapted to capture an image including at least a portion of an object and transmit the captured image; and a processor in communication with each of the image capturing devices, the processor adapted to transmit a control signal to each of the image capturing devices, receive each of the captured images, process the captured images, and transmit the processed captured images, wherein the processing of the captured images includes at least one of: balancing the color of each of the captured images; locating the object in each of the captured images; processing the background of each of the captured images; removing the background of each of the captured images; combining image planes of each of the captured images; resizing the captured images based on the size of the object; formatting the captured images into a single file; and adding action script to the single file to provide the appearance of rotational control of the formatted captured images.

The invention also provides methods for capturing and displaying images.

One method comprises the steps of: providing a plurality of image capturing devices adapted to capture a plurality of images; and providing a processor in communication with each of the image capturing devices, the processor adapted to perform the steps of: initiating a calibration image capture of each of the image capturing devices; receiving a calibration image from each of the image capturing devices; calibrating the image capturing devices in response to the received calibration images; initiating a final image capture of each of the image capturing devices; receiving a final captured image from each of the image capturing devices; and processing the final captured images to appear as a seamless single rotational image.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

Figure 1:
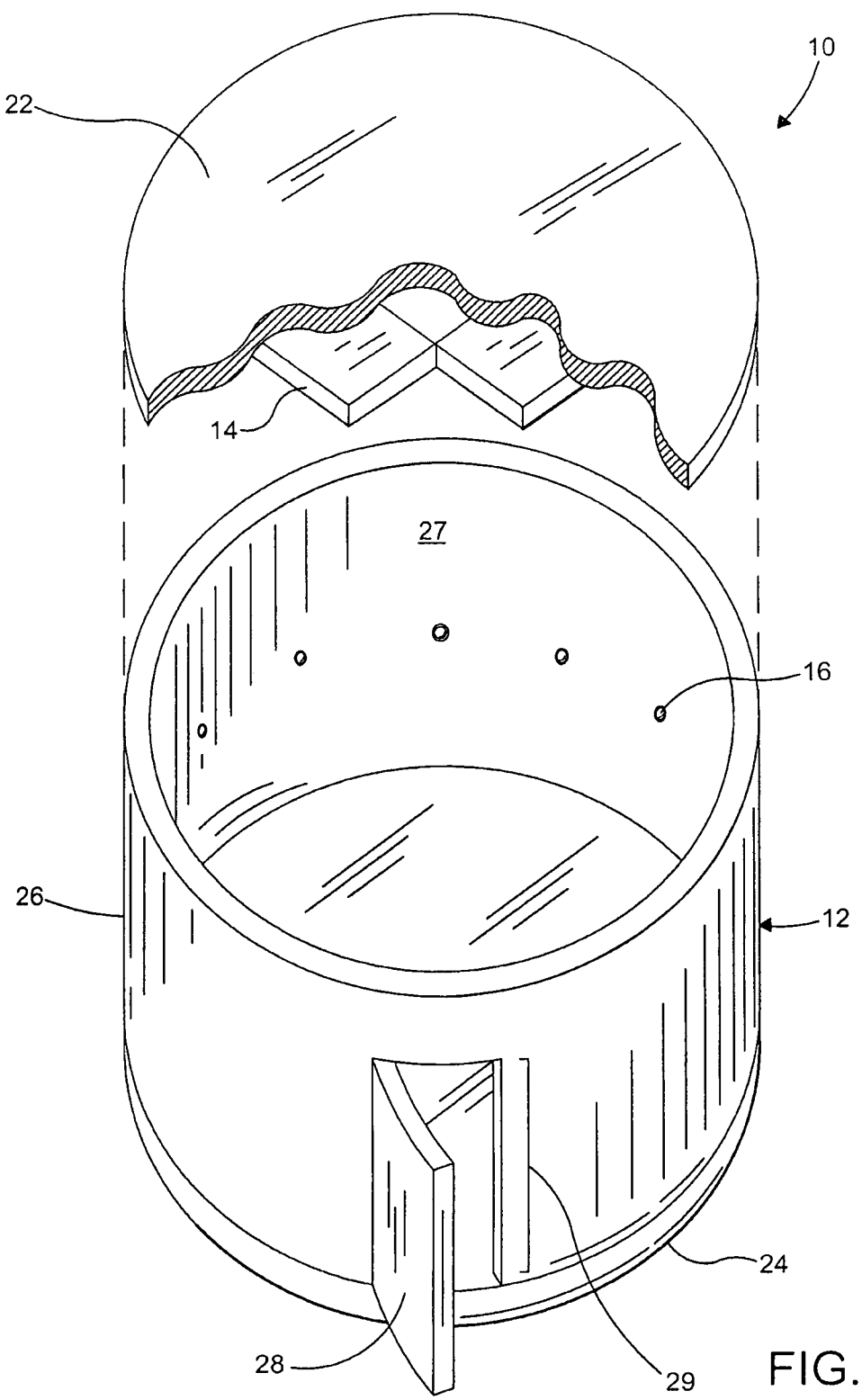
FIG. 1 is a partially exploded perspective view of an image capturing system according to an embodiment of the present invention with a top portion shown in section.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-5 illustrate an image capturing system 10 according to an embodiment of the present invention. As shown, the image capturing system 10 includes an image module 12, a lighting system 14, a plurality of image capturing devices 16, a processor 18, and a control interface 20. It is understood that the image capturing system 10 may include additional components, as desired.

In the embodiment shown, the image module 12 includes a top portion 22, a bottom portion 24, and a substantially annular wall 26 disposed between the top portion 22 and the bottom portion 24. As shown, the image module 12 is substantially cylindrical having a substantially disk-shaped top portion 22 and a substantially disk-shaped bottom portion 24. However, it is understood that the image module 12 may have any shape and size, as desired. It is further understood that the wall 26 of the image module 12 may be formed from a plurality of angular or curved sections (not shown). Other formations of the wall 26 may be used, as desired. In certain embodiments, the wall 26 may be entirely moveable and adapted to enclose only a portion of the image module 12, wherein the wall 26 is selectively moved to act as a backdrop for each of the image capturing devices 16. As a non-limiting example, an interior surface 27 of the wall 26, in cooperation with the top portion 22 of the image module 12 and the bottom portion 24 of the image module 12, defines a "booth" or room that provides an appearance of continuous uniformity when viewed from any perspective within the image module 12. The perceived uniformity of the interior surface 27 may be accomplished by engineered construction as well as specific lighting situated such that the interior surface 27 of the wall 26 appears monochromatic and continuous. It is understood that the interior surface 27 may be formed from of a variety of materials necessary to provide a substantially evenly lit surface. The interior surface 27 of the wall 26 may also include a material having translucent and/or transparent qualities in order to provide a backlighting effect. It is understood that other materials may be used to provide a substantially consistent backdrop or background appearance for each of the image capturing devices 16, both with respect to color and light intensity, in order to minimize the need to edit or process the images captured by the image capturing device 16. The wall 26 may also include support devices (not shown) for the image capturing devices 16 as well as various mounting devices (not shown) for the lighting system 14, as determined by the lighting requirements.

Figure 2:
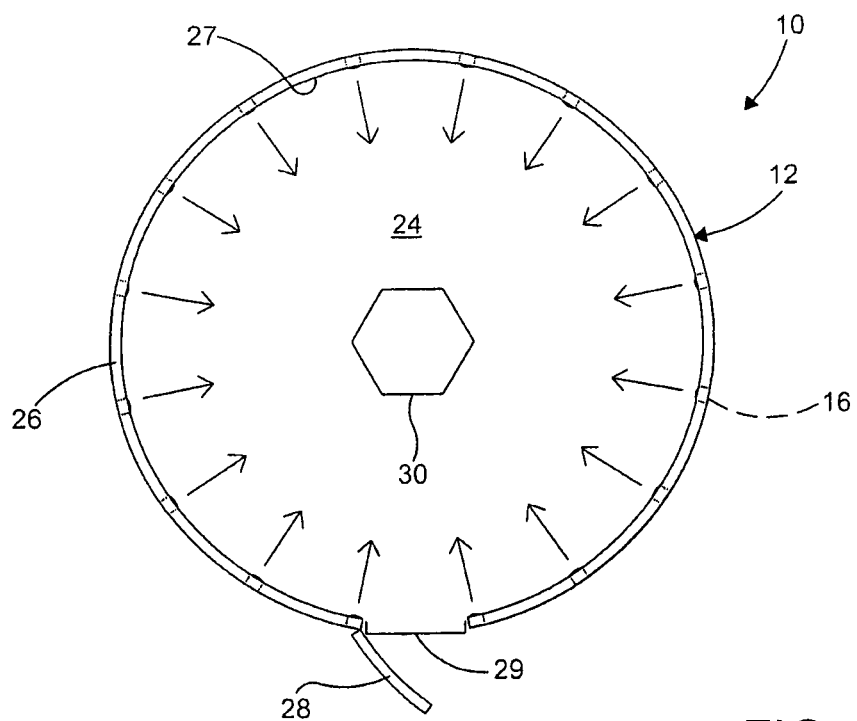
FIG. 2 is a top plan view of the image capturing system of FIG. 1 with the top portion removed and an object disposed therein.
Figure 3:
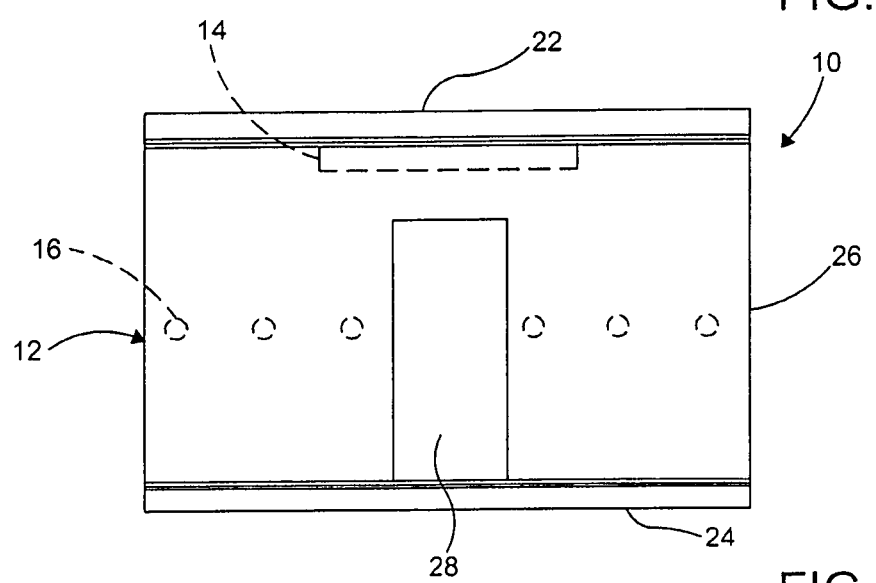
FIG. 3 is a front elevation view of the image capturing device of FIG. 1.

A moveable portion 28 of the wall 26 is adapted to provide an entry-way into the image module 12. As shown in FIGS. 1 and 2, the moveable portion 28 of the wall 26 is in an opened position, thereby providing a portal 29 into the image module 12. It is understood that the moveable portion 28 of the wall 26 is formed from a material such that the moveable portion 28 offers the same perceived continuity as the interior surface 27 of the wall 26. As shown in FIG. 3, the moveable portion 28 of the wall 26 is in a closed position, thereby sealing the image module 12 from the outside environment and creating a smooth and substantially uniform surface when viewed from any perspective within the image module 12. It is understood that in certain embodiments, the wall 26 does not include a moveable portion 28 or portal 29.

The top portion 22 of the image module 12 and the bottom portion 24 of the image module 12 are each formed from a similar material as the wall 26 and may further include mounting devices (not shown) for the image capturing devices 16 and the lighting system 14. However, other materials, both similar and different than the material of the wall 26, may be used, as desired. It is understood that the top portion 22 and the bottom portion 24 of the image module 12 may have a similar surface finish or appearance to provide for a substantially uniform surface when viewed from any perspective within the image module 12. It is further understood that in certain embodiments, it may be desirable to remove the top portion 22 and the bottom portion 24.

Figure 4:
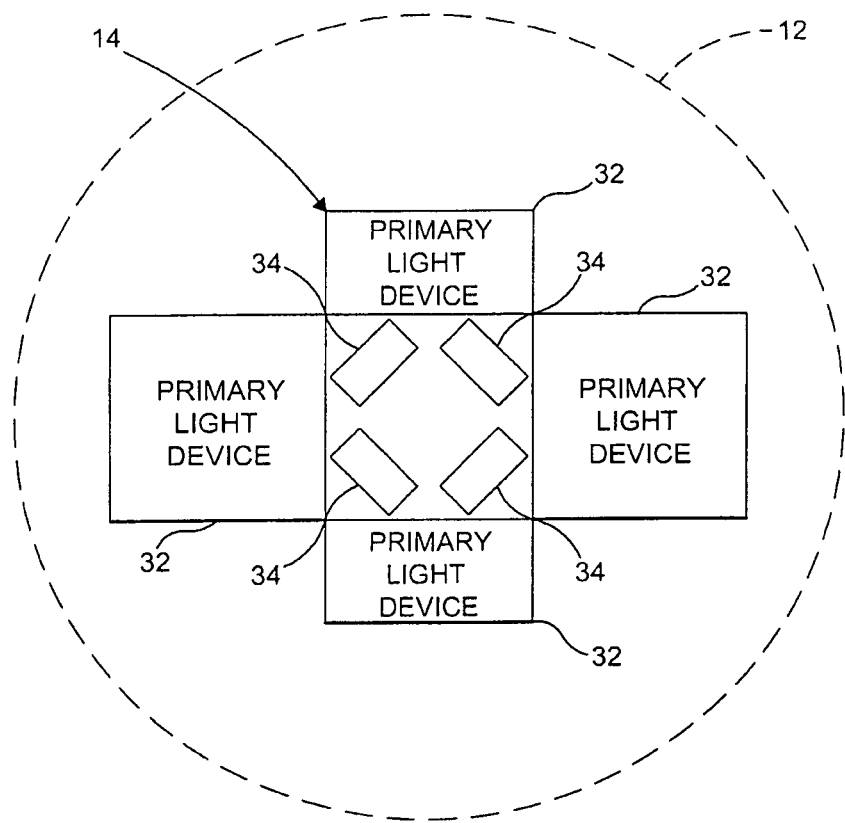
FIG. 4 is a schematic representation of a lighting system according to an embodiment of the present invention.

As shown in FIGS. 1 and 4, the lighting system 14 is disposed adjacent the top portion 22 of the image module 12 such that light emitted from the lighting system 14 illuminates an interior of the image module 12. It is understood that the light system 14 may be disposed around, above, and/or below the image capturing devices 16, as desired. As a non-limiting example, the light system 14 may be disposed within or behind transparent or translucent materials forming all or a portion of the wall 26. As more clearly shown in FIG. 4, the lighting system 14 includes a plurality of primary light devices 32 and a plurality of secondary light devices 34. It is understood that a single light device or light source may be used. It is further understood that any number of primary and secondary light devices 32, 34 may be used in any formation or combination, as desired. The light devices 32, 34 may be any variety or combinations of several types including, but not limited to, incandescent, fluorescent, gas discharge, light emitting diode, and strobe, for example. In certain embodiments, the light devices 32, 34 are adapted to provide different wavelengths or combinations thereof such as pure white, colored, infrared, and ultraviolet, for example. In the embodiment shown, the primary light devices 32 provide a predetermined lighting pattern for image capture by the image capturing devices 16, while the secondary light devices 24 provide a color effect for adjusting the appearance of an object 30 prior to image capture. However, it is understood that the light devices 32, 34 may provide any lighting and/or coloring pattern, as desired. It is further understood that the source of light may be the object 30 itself, or a secondary light source (not shown), for example.

Figure 5:
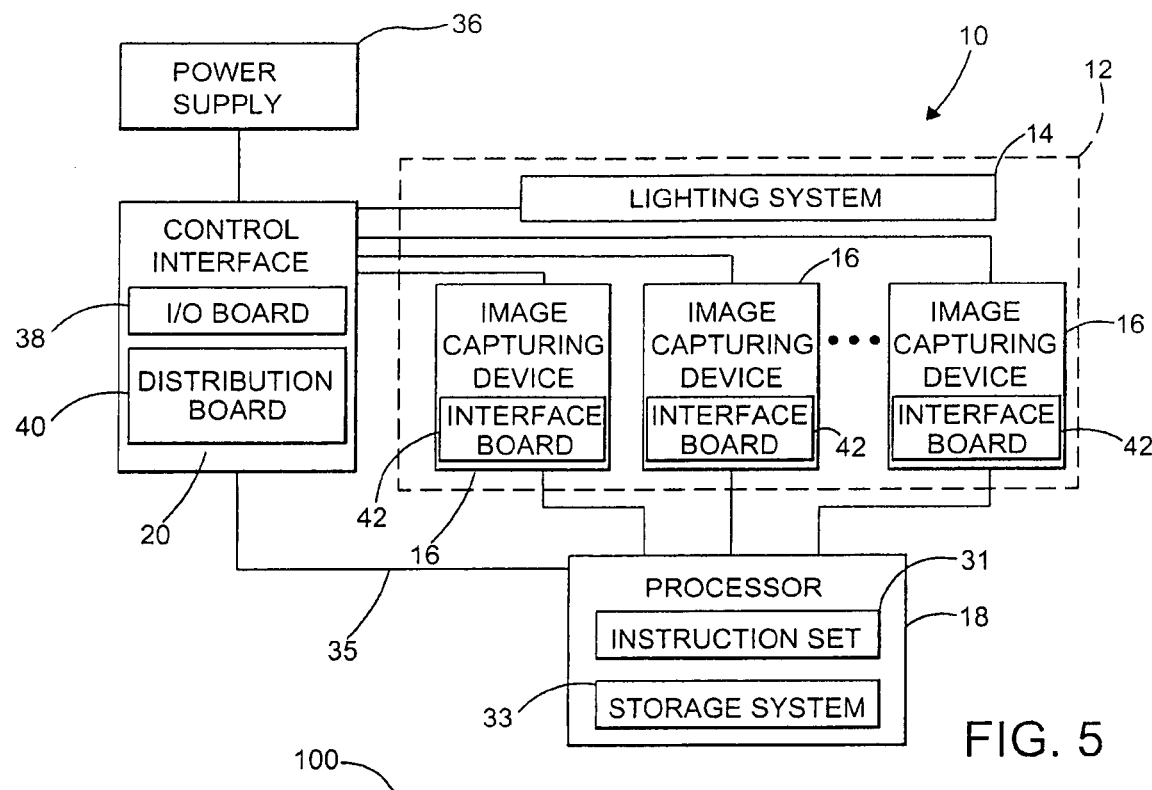
FIG. 5 is a schematic block diagram of the image capturing system of FIG. 1.

As more clearly shown in FIG. 5, the lighting system 14 is in communication with the processor 18, wherein the processor 18 is adapted to control a light output of the lighting system 14. As shown, a control signal 35 is transmitted by the processor 18 and routed through the control interface 20. However, it is understood that the processor 18 may have a direct communication with the lighting system 14. It is further understood that the control interface 20 may include additional processing of the control signal 35 before routing the control signal 35 to the lighting system 14. As a non-limiting example, the control signal 35 is received by at least one of the lighting system 14 and the image capturing devices 16 to control the light output of the lighting system 14 and the functions of the image capturing devices 16 respectively. However, the control signal 35 may also be adapted to control other systems and functions, as desired.

The image capturing devices 16 are disposed in an annular array to provide a plurality of captured images representing a 360 degree rotation about the object 30. It is understood that the axis of rotation about which the image capturing devices 16 are disposed may be modified, as desired. In the embodiment shown, the object 30 is a static object having a hexagonal shape. It is understood that the object 30 may have any shape and size, as desired. It is further understood that any number of objects 30 may be used, as desired. In certain embodiments, the object 30 is used for a calibration of the image capturing devices 16 and then removed and replaced with a final subject or object to be captured in the final rotational image.

As shown in FIGS. 1 and 2, the image capturing devices 16 may be disposed in or adjacent the wall 26 of the image module 12. Specifically, the image capturing devices 16 are mounted outward from the interior surface 27 of the image module 12, so that the line of sight of each of the image capturing devices 16 is directed toward a center-point of the image module 12, while minimizing the exposed portion of each of the image capturing devices 16. It is understood that the center-point may be defined as a pre-determined point equidistant from each of the image capturing devices 16. However, other arrangements and positioning of the image capturing devices 16 may be used, as desired. In certain embodiments, the image capturing devices 16 may be mounted in a similar annular arrangement using tripods (not shown) or other mounting devices, thus eliminating the image module 12.

In the embodiment shown, the image capturing devices 16 are buffered, high resolution, electronically controlled cameras equipped with appropriate lenses. Specifically, satisfactory results have been achieved using camera model BCE C050US, manufactured by Mightex; however, it is understood that other cameras or devices, now know or later developed, may be used, as desired. It is further understood that the image capturing devices 16 may include either CMOS or CCD sensors. Other sensors and electrical components may be used, as desired. The image capturing devices 16 may further include lenses having a variable aperture or a machined aperture. As a non-limiting example, the lenses may have a fixed aperture know in the art as an f/8; however, other apertures and f-numbers may be used, as desired. In certain embodiments, the lenses are adapted to be controlled by the processor to provide auto-focus and auto-zoom functions.

As shown, the image capturing devices 16 are in communication with the processor 18. Each of the image capturing devices 16 is adapted to transmit a captured image to the processor 18 in a pre-determined file format. The image capturing devices 16 are also adapted to receive the control signal 35 from the processor 18 for controlling the functions of the image capturing devices 16 such as image capture triggering, for example. In certain embodiments, the image capturing devices 16 are in communication with the control interface 20, wherein the control interface 20 provides appropriate electrical power to each of the image capturing devices 16 and a control of the image capturing device 16 features.

In the embodiment shown, the processor 18 is in communication with the control interface 20, the lighting system 14, and each of the image capturing devices 16. In certain embodiments, the communication between the image capturing devices 16 and the processor 18 is a bidirectional communication. It is understood that the communication means may be any suitable means such as USB, fire wire, coaxial, camera link, and wireless communication means, for example. Other means for communication, now known or later developed, may be used, as desired. The processor 18 is adapted to control the operation and functions of each of the image capturing devices 16 including, but not limited to, the image capture trigger of each of the image capturing devices 16. Additionally, the processor 18 is adapted to adjust and modify any received images in a variety of fashions including background continuity, color and intensity, shadow elimination, and axis of rotation adjustment, as required. The processor 18 is also adapted to control the light output of the lighting system 14 and a variety of attributes and functions of the image capturing devices 16 such as exposure times and triggering intervals. It is understood that the processor 18 may be adapted to perform other functions, analyses and processes, as desired. For example, the processor 18 may be adapted to control and change viewing angles, multiplicity of optical paths, optical filters, integration time(s), illumination, and sequence of image capture function. In certain embodiments, the processor 18 has a direct control of the image capturing devices 16. In other embodiments, the processor 18 transmits the control signal 35 to the control interface 20, wherein the control interface 20 routes the control signal 35 to each of the image capturing devices 16. As a non-limiting example, the control interface 20 may include additional processing and analysis of the control signal 35. It is understood that the functions of the processor 18 may be programmed prior to the image capture utilizing appropriate interfaces. It is also understood that the functions of the processor may be modified, as desired.

In the embodiment shown, the processor 18 is adapted to receive a calibration image from each of the image capturing devices 16, calibrate the image capturing devices 16 in response to the received calibration images, initiate a final image capture, receive a final image from each of the image capturing devices 16, process the final images, and digitally format the final images in a variety of formats for importing, exporting or on-site viewing.

In the embodiment shown, the calibration performed by the processor 18 in response to the calibration images includes a centering process, an alignment process, an image capturing device adjustment process, a color balancing process, and a background data capture process. It is understood that additional processes may be included in the calibration performed by the processor 18, as desired. The centering process includes the steps of: programmatically finding the center of the object 30; and computing an "X" and "Y" shift to align the object 30 directly in the center of the captured image. The alignment process includes the steps of: locating a vertical edge of the object 30; and computing an angle of a vertical edge of the object 30 relative to the vertical pixels of the captured image to determine a rotation offset of each of the image capturing devices 16. The adjustment process includes the steps of: adjusting the exposure time of each of the image capturing devices 16 for uniformity between each other; and adjusting the red, green, and blue gains to color balance each of the image capturing devices 16 for uniformity. Specifically, the processor 18 defines a calibration window in a portion of each of the calibration images and averages the gray scale values of the pixels in any one of a plurality of image planes (color planes). Then the processor 18 adjusts the exposure time of each of the image capturing devices 16 to get a substantially equal color balance for each of the calibration windows of the calibration images. Utilizing the same calibration window as is used for the exposure time calibration, the processor 18 averages the gray scale values for each of the image planes and factors each of the planes to a pre-determined gray scale based on the values of the calibration window. It is understood that the other means for adjusting the exposure time and color balance of each of the image capturing devices 16 may be used, as desired. Further, the background data collection process includes recognizing and substantially eliminating any inconsistencies in the background provided by the image module 12 such as apertures formed in the wall 26 within the field of view of any of the image capturing devices 16 or variations in continuity created by the portal 29. Specifically, the processor 18 is adapted to define the pixel values that are contained within any apertures or variations in the continuity of the interior surface 27 of the wall 26. When the final image is captured, the apertures and variations can be located and substantially eliminated.

The processor 18 is also adapted to perform processing functions on the final images captured by the image capturing devices 16. In the embodiment shown, the final captured image processing functions include: programmatically color balancing the captured image; programmatically finding the object 30 in the captured image; programmatically removing apertures and inconsistencies that appear in the captured image; programmatically processing and/or eliminating the background surrounding the object 30; programmatically combining the image planes (e.g. red, green, and blue; or CMYK) into an RGB image; and programmatically resizing the final captured image based on the size of the object 30. However, it is understood that other processing and editing may be performed on the final captured images, as desired. In certain embodiments, the color balancing includes the steps of: selecting a portion of each of four quadrants of each of the final captured images to verify that the calibration color factors are still valid, wherein the selected portions are substantially background pixels (i.e. contain no people or objects); and applying the color balance factor to the captured image. In certain embodiments, locating the object 30 includes the steps of: averaging the pixel values in a number of background windows (i.e. predefined areas that are just background and contain no people or objects) located in each of the four quadrants; applying a threshold factor to the resultant average to create a threshold value; processing each pixel, wherein any pixels with a value greater than the threshold value will be changed to a 1 and any pixel with a value less than the threshold value will be changed to a 0; applying a particle analysis algorithm to the resultant binary image, wherein the largest particle is assumed to be the object 30; defining the center of mass of the largest particle; utilizing a copy of any one of the image planes and applying a function, such as a "magic wand" function known in the art, to the binary image at the center of mass of the largest particle to generate a Region-of-Interest (ROI) Descriptor or mask of the object 30; and applying the object mask to each of the image planes (red, green, and blue; or CMYK). It is understood that other methods of locating the object 30 in the final image may be used, as desired. It is further understood that the processing functions may be modified to find and process a captured image having more than one object 30. For example, the particle analysis algorithm may be modified to identify a hierarchy of the largest particles, wherein any number of the largest particles are assumed to be subjects rather than background.

In certain embodiments, the processing of the background and removing of the apertures includes the steps of: locating the pixels within the apertures and inconsistencies as defined in the calibration phase; processing each of the pixels, wherein the pixels outside of the pre-determined object mask are adjusted to the same gray scale value as the background.

In certain embodiments, the processing of the background further includes applying a lookup table to change the pixel value of any pixel over a pre-determined pixel value to 255. It is understood that any pixel value settings may be used, as desired. In certain embodiments, the resizing of the object includes flattening the image, creating a 32 bit image (8 bits red, 8 bits green, 8 bits blue, 8 bits transparency; or CMYK equivalent), and thereafter creating a Portable Network Graphics (PNG) image. It is understood that other resizing methods and image formats may be used, as desired. It is further understood that the final image may have any number of bits such as 64 bits, for example.

In certain embodiments, the functions of the processor 18 are based upon an instruction set 31. The instruction set 31, which may be embodied within any computer readable medium, includes processor executable instructions for configuring the processor 18 to perform a variety of tasks. It is understood that the instruction set may be modified to control the functions of the processor, as desired. As a non-limiting example, the instruction set 31 is stored in a storage system 33. The storage system 33 may be a single storage device or may be multiple storage devices. Portions of the storage system 33 may also be located on the processor 18. Furthermore, the storage system 33 may be a solid state storage system, a magnetic storage system, an optical storage system or any other suitable storage system. It is understood that other data and information may be stored in the storage system 33, as desired.

The control interface 20 is in communication with the processor 18, each of the image capturing devices 16, the lighting system 14, and the power supply 36. The control interface 20 is adapted to receive an electric current from the power supply 36 and route an appropriate pre-determined current to each of the image capturing devices 16. In certain embodiments, the control interface 20 is also adapted to receive the control signal 35 from the processor 18 and route the control signal 18 to each of the image capturing devices 16 and the lighting system 14, as needed. It is understood that the control interface 20 may be adapted to regulate and process the received control signal 35 before distributing each of the dedicated control signals to the associated image capturing device 16 and lighting system 14.

As a non-limiting example, the control interface 20 may include an I/O board 38 and a distribution board 40 adapted to communicate with the processor 18 to control the functions of each of the image capturing devices 16. It is understood that the I/O board 38 may be any I/O device or system, now known or later developed, such as a USB-6501, 24 port I/O board, manufactured by National Instruments, for example. The distribution board 40 is adapted to receive a 12 volt supply from the power supply 36 and data signals from the I/O board 38 representing image capture triggers and on/off triggers, wherein electric power and data signals are routed to each of the image capturing devices 16. It is understood that the distribution board 40 may also be adapted to regulate and route power and data signals to other devices and systems such as USB hubs, for example. It is further understood that the I/O board 38 and the distribution board 40 may include additional components and control features, as desired. Each of the image capturing devices 16 may further include an associated interface board 42 adapted to intercommunicate with the processor 18 and receive electric power and data signals from the distribution board 40. For example, the interface board 42 of each of the image capturing devices 16 is adapted to receive a 12 volt supply, differential image capture triggers, and differential on/off triggers for powering and controlling the associated image capturing device 16. It is understood that the interface boards 42 may include voltage regulators to modify the applied voltage to each of the image capturing devices 16. It is further understood that the interface boards 42 may include additional components, as desired.

Figure 6:
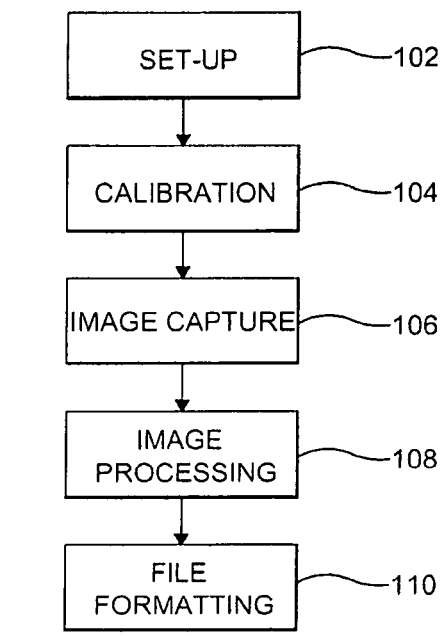
FIG. 6 is a schematic flow chart of a method for acquiring, processing, and displaying rotational images according to an embodiment of the present invention.

Referring to FIG. 6, a method 100 for acquiring, processing, and displaying images according to an embodiment of the invention will now be described. In step 102, the image capturing devices 16 are "set-up" and arranged in an appropriate manner such as an annular array, for example. Other arrangements may be used, as desired. In certain embodiments, the object 30 is positioned at the pre-determined center-point for calibrating the image capturing devices 16. Each of the image capturing devices 16 is adjusted to provide an appropriate focus, an appropriate iris or light capture, and an appropriate alignment and orientation along the 'x', 'y', and 'z' axis. It is understood that the adjustments and "set-up" to the image capturing devices may be done manually or by some automated means.

In step 104, the image capturing devices are calibrated to minimize processing of the captured images. It is understood that the calibration step 104 of the image capturing devices may be a one-time initial calibration for a particular environment. It is further understood that the calibration step 104 may be initiated at any time, as desired. The calibration step 104 includes a sub-routine wherein the processor 18 transmits the control signal 35 to each of the image capturing devices 16, thereby initiating an image capture function of each of the image capturing devices 16. It is understood that the sequencing of the image capture function of each image capturing devices 16 may be pre-determined to replicate a substantially simultaneous image capture from all image capturing devices. It is further understood that any sequence may be pre-programmed or adjusted in real-time as desired. Once the calibration images are captured, each image capturing device 16 transmits the associated calibration image to the processor 18 for analysis. The analysis performed by the processor 18 includes at least one of the centering process, the alignment process, the adjustment process, and the color balancing process, previously described herein. It is understood that other process may be performed, as desired.

In step 106, the object 30 used for calibration is removed and a final subject or object to be captured is placed substantially at the center-point of the image capturing devices 16. Once the final subject is in position, the processor initiates a final image capture. Specifically, the processor 18 transmits the control signal 35 to each of the image capturing devices 16, thereby initiating an image capture function of each of the image capturing devices 16. As a non-limiting example, the processor 18 is adapted to generate an external image capture trigger via USB I/O board that will be sent to each image capturing device 16 at substantially the same time. As a result of the trigger, each of the image capturing devices 16 immediately capture a final image and store the final image in a buffer of the associated image capturing device 16. It is understood that the sequencing of the image capture function of each image capturing devices 16 may be pre-determined to replicate a substantially simultaneous image capture from all image capturing devices 16. It is further understood that any sequence may be pre-programmed or adjusted in real-time as desired. Once the final images are captured, each of the image capturing devices 16 transmits the associated final image to the processor 18 for image processing. As such, the processor 18 monitors the communication between the image capturing devices 16 and the processor 18 and subsequently downloads the final images from each of the buffers of the image capture devices 16. It is understood that the processor 18 may shift and rotate each of the final images by the number of pixels that were defined in the alignment process of the calibration step 104. It is further understood that additional control features and processing may be included, as desired.

In step 108 the processor receives the final images. Specifically, the processor 18 initiates particular functions to programmatically color balance the image, programmatically find the object in the image, programmatically remove the camera holes that appear in the image, programmatically process and/or eliminate the background, programmatically combining the image planes (RGB or CMYK) into an RGB image, and programmatically resize the final images based on the subject size, as previously described herein.

In step 110 the processor digitally formats each of the final images into a single digitally readable file. As a non-limiting example, the digital file format is Shockwave Flash (SWF). However, it is understood that other formats now known or later developed may be used, as desired. After formatting, the processor 18 programmatically adds the appropriate scripting to provide for image rotation via a mouse or pointing device. For example, the processor 18 may be adapted to read each of the images into the SWF file and add action script to cause the final image to appear in sequence as the mouse is moved left to right. As such, the mouse action will make the images appear as a seamless single rotational image. The SWF file including the appropriate script is stored as the final rotational image file. Once the rotational image file is complete, the processor uploads the finished product to a host server (not shown). It is understood that the rotational image file may be stored and transferred in any manner, as desired.

Accordingly, the present invention provides a time efficient system and method for acquiring, processing, and displaying rotational images. The system and method create a "spin images" for a variety of subjects and objects in a manner of seconds, while automating the processing of the final captured images and thereby minimizing the required training and specialized knowledge of a user.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An image capturing system comprising:
   a plurality of image capturing devices disposed in an annular array and directed toward a center-point, wherein each image capturing device captures an image of an object positioned at the center-point and transmits the captured image; and
   a processor in communication with each of the image capturing devices, wherein the processor transmits a control signal to each of the image capturing devices, receives each of the captured images, processes the captured images, and transmits the processed captured images, wherein the processing of the captured images includes combining the images to appear as a seamless single rotational image of the object with a continuous and non-varying background of the object.

2. The image capturing system according to claim 1, wherein the processing of the captured images further includes at least one of:
   balancing the color of each of the captured images;
   locating the object in each of the captured images;
   processing the background of each of the captured images;
   removing the background of each of the captured images;
   combining image planes of each of the captured images;
   resizing the captured images based on the size of the object;
   formatting the captured images into a single file; and adding action script to the single file to provide the appearance of rotational control of the formatted captured images.

3. The image capturing system according to claim 1, wherein the image capture of each of the image capturing devices is substantially simultaneous with the other image capturing devices.

4. The image capturing system according to claim 1, further comprising:
an image module adapted to house the image capturing devices, the image module having an interior surface providing a substantially uniform appearance when viewed from any perspective within the image module.

5. The image capturing system according to claim 1, further comprising a lighting system adapted to illuminate the object.

6. The image capturing system according to claim 5, wherein the processor is in communication with the lighting system and adapted to control a light output of the lighting system.

7. The image capturing system according to claim 1, wherein the functions of the processor are based upon a programmable instruction set.

8. The image capturing system according to claim 1, further comprising:
a power supply adapted to transmit a pre-determined electric current; and
a control interface in communication with the power supply, the processor, and each of the image capturing devices, wherein the control interface is adapted to receive the electric current transmitted by the power supply and the control signal transmitted by the processor and route the electric current and the control signal to each of the image capturing devices.

9. An image capturing system comprising:
a plurality of image capturing devices disposed in an annular array and directed toward a center-point, wherein each of the image capturing devices captures an image including at least a portion of an object positioned at the center-point and transmits the captured image; and
a processor in communication with each of the image capturing devices, wherein the processor transmits a control signal to each of the image capturing devices, receives each of the captured images, processes the captured images to appear as a seamless single rotational image of the object with a continuous and non-varying background of the object, and transmits the processed captured images, wherein the processing of the captured images includes at least one of:
balancing the color of each of the captured images;
locating the object in each of the captured images;
processing the background of each of the captured images;
removing the background of each of the captured images;
combining image planes of each of the captured images;
resizing the captured images based on the size of the object;
formatting the captured images into a single file; and
adding action script to the single file to provide the appearance of rotational control of the formatted captured images.

10. The image capturing system according to claim 9, further comprising:
an image module adapted to house the image capturing devices, the image module having an interior surface providing a substantially uniform appearance when viewed from any perspective within the image module.

11. The image capturing system according to claim 9, wherein the image capture of each of the image capturing devices is substantially simultaneous with the other image capturing devices.

12. The image capturing system according to claim 9, further comprising a lighting system adapted to illuminate the object.

13. The image capturing system according to claim 12, wherein the processor is in communication with the lighting system and adapted to control a light output of the lighting system.

14. The image capturing system according to claim 9, wherein the functions of the processor are based upon a programmable instruction set.

15. The image capturing system according to claim 9, further comprising:
a power supply adapted to transmit a pre-determined electric current; and
a control interface in communication with the power supply, the processor, and each of the image capturing devices, wherein the control interface is adapted to receive the electric current transmitted by the power supply and the control signal transmitted by the processor and route the electric current and the control signal to each of the image capturing devices.

16. The image capturing system according to claim 15, wherein the control interface includes an I/O board and a distribution board and each of the image capturing devices includes an interface board, the I/O board and the distribution board cooperate to route the control signal, electric power, and data to each of the interface boards for selectively controlling the image capturing devices.

17. A method for capturing and displaying images, the method comprising the steps of:
providing a plurality of image capturing devices disposed in an annular array and directed toward a center-point for capturing a plurality of images of an object positioned at the center-point; and
providing a processor in communication with each of the image capturing devices, the processor performing the steps of:
initiating a calibration image capture of each of the image capturing devices;
receiving a calibration image from each of the image capturing devices;
calibrating the image capturing devices in response to the received calibration images;
initiating a final image capture of each of the image capturing devices;
receiving a final captured image from each of the image capturing devices; and
processing the final captured images to appear as a seamless single rotational image of the object with a continuous and non-varying background of the object.

18. The method according to claim 17, wherein the calibrating of the images capturing devices includes at least one of a centering process, an alignment process, an image capturing device adjustment process, a color balancing process, and a background data capture process.

19. The method according to claim 17, wherein the processing of the final images includes at least one of:
balancing the color of each of the captured images;
locating an object in each of the captured images;
processing the background of each of the captured images;

removing the background of each of the captured images;
combining the image planes of each of the captured images;
resizing the captured images based on the size of the object;
formatting the captured images into a single file; and
adding action script to the single file to provide the appearance of rotational control of the formatted captured images.

20. The method according to claim 17, wherein the image capture of each of the image capturing devices is substantially simultaneous with the other image capturing devices.

* * * * *